United States Patent
Ortmann et al.

(10) Patent No.: US 9,725,364 B2
(45) Date of Patent: Aug. 8, 2017

(54) METHOD FOR REDUCING HEXAVALENT CHROMIUM IN OXIDIC SOLIDS

(71) Applicant: LANXESS Deutschland GmbH, Cologne (DE)

(72) Inventors: Rainer Ortmann, Cologne (DE); Holger Friedrich, Newcastle (ZA); Chris Labuschagne, Newcastle (ZA); Dawie Van Der Merwe, Newcastle (ZA); Barry Visagie, Newcastle (ZA)

(73) Assignee: LANXESS Deutschland GmbH, Cologne (DE)

( * ) Notice: Subject to any disclaimer, the term of this patent is extended or adjusted under 35 U.S.C. 154(b) by 101 days.

(21) Appl. No.: 14/411,618

(22) PCT Filed: Jul. 5, 2013

(86) PCT No.: PCT/EP2013/064292
§ 371 (c)(1),
(2) Date: Dec. 29, 2014

(87) PCT Pub. No.: WO2014/006196
PCT Pub. Date: Jan. 9, 2014

(65) Prior Publication Data
US 2015/0166411 A1 Jun. 18, 2015

(30) Foreign Application Priority Data

Jul. 6, 2012 (EP) .................................. 12175378
Feb. 14, 2013 (EP) .................................. 13155203

(51) Int. Cl.
C04B 14/00 (2006.01)
C04B 14/30 (2006.01)
C01G 37/00 (2006.01)
C09C 1/58 (2006.01)
C04B 7/34 (2006.01)
C08L 95/00 (2006.01)
C22B 7/00 (2006.01)

(52) U.S. Cl.
CPC ............ *C04B 14/308* (2013.01); *C01G 37/00* (2013.01); *C04B 7/34* (2013.01); *C08L 95/00* (2013.01); *C09C 1/58* (2013.01); *C22B 7/002* (2013.01); *C01P 2006/80* (2013.01)

(58) Field of Classification Search
CPC ......... C04B 7/34; C04B 14/308; C22B 7/002; C08L 95/00; C01G 37/00; C09C 1/58
USPC ............. 106/638, 284.02, 453, 792; 423/53; 588/319, 412
See application file for complete search history.

(56) References Cited

U.S. PATENT DOCUMENTS 4,772,316 A 9/1988 Radke et al.
6,336,967 B1 * 1/2002 Matsunaga et al. .......... 106/789
6,872,247 B1 * 3/2005 Jardine et al. ................ 106/808
7,128,782 B2 * 10/2006 Jardine et al. ................ 106/730
7,232,483 B2 * 6/2007 Jardine et al. ................ 106/819
8,142,564 B2 * 3/2012 Debegnac et al. ............ 106/713
8,361,221 B2 * 1/2013 Andreani et al. ............. 106/728
2006/0096420 A1 5/2006 Sugitatsu et al.

FOREIGN PATENT DOCUMENTS

| CN | 100999335 A | 7/2007 |
| CN | 102502916 A | 2/2014 |
| EP | 1678337 B1 | 7/2006 |
| JP | 57-135724 * | 8/1982 |
| WO | 9314232 A1 | 7/1993 |

OTHER PUBLICATIONS

Wang, T., "A new method for the treatment of chromite ore processing residues", ScienceDirect, Journal of Hazardous Materials, 149, (2007), pp. 440-444.
Ullmann's Encyclopedia of Industrial Chemistry, Online Edition, vol. A9, pp. 163-166.
International Search Report from co-pending Application PCT/EP2013/064292 dated Aug. 10, 2013, 1 page.
Su, Chunming et al., "Treatment of Hexavalent Chromium in Chromite Ore Processing Solid Waste Using a Mixed Reductant Solution of Ferrous Sulfate and Sodium Dithionite", American Chemical Society, Environ. Sci. Technol. 2005, 39, pp. 6208-6216.
Wazne, Mahmoud et al., "Remediation of chromite ore processing residue using ferrous sulfate and calcium polysulfide", Geosciences Journal, vol. 11, No. 2, 2007, pp. 105-110.
Moon Deok Hyun et al., Particle size and pH effects on remediation of chromite ore processing residue using calcium polysulfide (caS5), Elsevier, Science of the Total Environment 399, 2008, pp. 2-10.
Cao Jiasheng, et al., "Stabilization of chromium ore processing residue (COPR) with nanoscale iron particles", Elsevier, Journal of Hazardous Materials B132, 2006, pp. 213-219.
Zhu, Wenjie et al., "Reduction of high concentrations of chromate by *Lecobacter* sp. CRB1 isolated from changsha, China", Springer Science+Business Media B.V., World J Microbiol Biotechnol 24, 2008, pp. 991-996.
James, Bruce R., et al., "Hexavalent Chromium Extraction from Soils: A Comparison of Five Methods", American Chemical Society, Environ. Sci. Technol. 29,1995, pp. 2377-2381.

(Continued)

*Primary Examiner* — Steven Bos

(57) ABSTRACT

Process for reducing hexavalent chromium in oxidic solids, which comprises the steps:
a) mixing of the oxidic solid containing Cr(VI) with a carbon-containing compound which is liquid in the range from 20 to 100° C.,
b) treatment of the mixture obtained after a) in an indirectly heated reactor at a temperature of from 700° C. to 1100° C., particularly preferably at a temperature of from 800° C. to 1000° C., under a protective atmosphere,
c) cooling of the reaction product obtained after b) to at least 300° C., preferably at least 150° C., under a protective atmosphere.

17 Claims, No Drawings

(56) References Cited

OTHER PUBLICATIONS

Zhang, Dalei, et al., "Treatment of Chromite Ore Processing Residue by pyrolysis with rice straw", Elsevier, Chemosphere 77, 2009, pp. 1143-1145.
Zhang, Dalei, et al., "Remediation of chromite ore processing residue by pyrolysis process with sewage sludge", Elsevier, Bioresource Technology 100, 2009 pp. 2874-2877.
Graham, Margaret C., et al., "Calcium polysulfide remediation of hexavalent chromium contamination from chromite ore processing residue", Elsevier, Science of the Total Environment 364, 2006, pp. 32-44.

* cited by examiner

METHOD FOR REDUCING HEXAVALENT CHROMIUM IN OXIDIC SOLIDS

The invention relates to a process for reducing hexavalent chromium in oxidic solids. In particular, it concerns the reduction of Cr(VI) in chromium ore residues (in English also referred to as Chromite Ore Processing Residue (COPR)) which are obtained as by-products in the production of chromium chemicals from chromite (chrome iron ore), and also the use thereof as fillers in the production of lime and/or cement-bonded building materials, of asphalt and/or as starting material for the production of steel and/or other alloys.

Among the various minerals containing chromium, only the chromium spinets, especially chromite (chrome iron ore, idealized: $FeCr_2O_4$), are of economic importance.

Sodium dichromate is by far the most important starting material for producing chromium chemicals. The only process for producing sodium dichromate from chromite which is carried out industrially on a large scale is the oxidative alkaline digestion of chromite using sodium carbonate (soda) or sodium hydroxide and air or oxygen in the presence of an opening material at temperatures of about 1100° C. This process, which has been described comprehensively in the specialist literature, will be discussed only briefly here (see, for example, Ullmann's Encyclopedia of industrial Chemistry, online Edition, Vol. A9, pages 163-466, Wiley-VCH Verlag GmbH Co. KGaA, Weinheim 2012, published online 15 Jun. 2000). It comprises essentially three steps:

oxidative digestion of chromium ore or chromium ore concentrate under alkaline conditions leaching out of the sodium monochromate formed and separation of the sodium monochromate-containing solution from the insoluble residue (chrome ore residue) by solid-liquid separation conversion of the sodium monochromate into sodium dichromate by acidification of the solution.

Apart from chromite and sodium alkalis, especially sodium carbonate, materials which are intended to maintain the porosity of the furnace contents during digestion (known as opening materials) are additionally added to the furnace mixture. The porosity is necessary to provide a sufficient surface area for the reaction with oxygen. The chromium yield when chromite is used is, depending on the composition, in the range from 74% to 90% of the chromium present in the chrome ore.

In the process for producing sodium dichromate, part of the sodium carbonate which is necessary for the alkaline digestion can be replaced by calcium carbonate $CaCO_3$ or dolomite $(CaMg(CO_3)_2)$ or calcium oxide CaO (lime). Such processes are, depending on the proportion of added calcium oxide, referred to as high lime, no lime or low lime processes. The disadvantages of the use of calcium oxide are that up to four tonnes of toxic hazardous waste, which is carcinogenic because of its calcium chromate content, are formed per tonne of sodium dichromate produced. It is therefore desirable to add as little calcium oxide as possible to the alkaline digestion.

The dissolved monochromate is separated off after cooling and leaching at a pH set by addition of acids or dichromate solution by means of solid-liquid separation, generally by filtration. The insoluble residue is leached a number of times in order to reduce the content of water-soluble Cr(VI). Part of the residue can be dried in order to be fed back to the furnace mixture as opening material.

The remaining residue, known as chrome ore residue (Chromite Ore Processing Residue, COPR), still contains Cr(VI). Part of the Cr(VI) is still in water-soluble form as sodium monochromate, but leaching at low Cr(VI) contents is no longer economically feasible. In addition, part of the Cr(VI) is also in water-insoluble or sparingly water-soluble form which can likewise not be recovered with an economically justifiable outlay.

The chromite ore residue can, depending on whether the high lime process, no lime process or low lime process has been used for the oxidative alkaline digestion of chrome ore, fluctuate in terms of its composition, in particular the CaO content. Chromite ore residues from the high lime process comprise up to 35% by weight of CaO, those from the no lime process usually comprise less than 5% by weight, while those from the low lime process contain from 5 to 35% by weight.

When the chromite ore residue is disposed of in a landfill in its leached form and without additional appropriate treatment, as was often the case in the past, the sparingly soluble Cr(VI) compounds can slowly be leached out over decades and Cr(VI) can thus get into the environment. For this reason, groundwater and the earth around many chromite ore residue landfills are polluted with a high level of Cr(VI).

For this reason, the chromite ore residue has for some decades generally been subjected to a reduction process in order to convert the Cr(VI) still present into unproblematical Cr(III) before it is finally disposed of in a landfill. It is important here that very complete reduction of the Cr(VI) present is achieved, with the difficult-to-access and water-insoluble or sparingly water-soluble Cr(VI) which is not located at the surface of the residue but is instead enclosed by a silicon dioxide and/or aluminium oxide layer is also included.

In addition, treatment with a chemical reducing agent such as Fe(II) sulphate or sulphur dioxide is known, with the latter also being able to be used in the form of hydrogen sulphite ions (see Ullmann's Encyclopedia of Industrial Chemistry, online Edition, Vol. A9, page 165, Wiley-VCH Verlag GmbH Co. KGaA, Weinheim 2012, published online 15 Jun. 2000).

Recently, the use of other reducing agents or mixtures of various reducing agents has also been proposed for the treatment of chromite ore residues. Thus, Su and Ludwig (Environ Sci. Technol. 2005, 39, 6208-6216) propose, for example, a mixture of Fe(II) sulphate and sodium dithionite $(Na_2S_2O_4)$. The advantage of this $FeSO_4/Na_2S_2O_4$ mixture is that the precipitation of Fe(II) ions is prevented by $Na_2S_2O_4$ and a more effective reduction of Cr(VI) is thus said to be ensured over a relatively long period of time. Nevertheless, complete reduction of the Cr(VI) in the chromite ore residue was not able to be effected in this process. In the alkaline digestion process described in USEPA (United States Environmental Protection Agency, USEPA) SW-846 method 3060A, the Cr(VI) content decreases merely from 252 mg/kg to 31.4 mg/kg.

The use of calcium polysulphide $(CaS_5)$ or mixtures of Fe(II) sulphate and calcium polysulphide for reducing the Cr(VI) content in chromite ore residues has also been reported in the literature. Thus, for example, Graham et al. (Science of the total Environment, 2006, 364(1-3), 32-44), Moon et al. (Science of the Total Environment, 2008, 399, 2-10) and Wazne et al. (Geosciences Journal, 2007, 11(2), 105-110) describe experiments in which calcium polysulphide was used as reducing agent. However, in all cases complete reduction of the Cr(VI) in chromite ore residue could not be successfully achieved.

All these processes are based on a reducing agent which is stable over a very long period of time and is thus also able to reduce the Cr(VI) which is liberated only slowly from the chromite ore residue over a very long period of time being provided for the reduction of Cr(VI). However, since the liberation of Cr(VI) can continue for decades, it is doubtful that these proposals are actually suitable for reducing Cr(VI) ire chromite ore residue completely. Thus, for example, Fe(II) is, even at very low pH values, slowly oxidized in air to Fe(III) and is then no longer available as reducing agent.

US 2010/0135876 A1 discloses a wet-chemical process for reducing Cr(VI) in chromite ore residues, in which Fe(II) ions which act as reducing agent are "fixed" in the form of a sparingly soluble precipitate on the surface of the COPR particles and are thus also supposed to be able to be effective over a relatively long period of time. In the process disclosed, the Cr(VI) present in the COPR matrix is firstly dissolved by adding a sufficient amount of Fe(II) sulphate. The Fe(II) ions also effect reduction of the liberated Cr(VI) to Cr(III). At the same time, $Fe(OH)_3$ and $Al(OH)_3$ and also $CaSO_4$ precipitate, which promotes the dissolution of the COPR particles, Excess Fe(II) is then "fixed" in the form of a sparingly soluble precipitate on the surface of the COPR particles. This is preferably effected by addition of a sulphide, for example sodium sulphide ($Na_2S$), sodium hydrogensulphide (NaHS) or calcium polysulphide ($CaS_x$), as a result of which iron(II) sulphides are precipitated, or by addition of phosphoric acid, as a result of which Fe(II) phosphates are precipitated. However, it is known that FeS decomposes in boiling water. Under the conditions of the alkaline digestion process as per USEPA SW-846 method 3060A, FeS decomposes again. The Fe(II) and sulphide ions liberated here can then reduce the Cr(VI) still bound in the COPR matrix, which is likewise liberated during the alkaline digestion process, resulting in a falsified result since Cr(VI) can no longer be detected.

In addition, US 2010/0135876 A1 describes the phenomenon that after drying of the COPR samples which have been reduced only with Fe(II) sulphate, significant amounts of Cr(VI) (about 1100 ppm or 1500 ppm) can be detected by means of the alkaline digestion process. They attribute this either to a reoxidation of Cr(III) to Cr(VI) by means of atmospheric oxygen or oxidation of Fe(II) to Fe(III) by means of atmospheric oxygen. However, US 2010/0135876 A1 does am take into account that the dissolution of the Cr(VI) bound in the COPR matrix is incomplete.

Cao and Zhang (J. Hazard. Materials B, 2006, B132, 213-219) describe the use of nanosize iron particles (known as zero-valent iron) as reducing agent. A disadvantage of this process is that the nanosize iron particles (<100 nm, specific surface area about 35 $m^2/g$) are very costly to produce and are therefore suitable at most for laboratory experiments, but at present do not come into question for use on an industrial scale. In addition, the nanosize iron particles are slowly oxidized by air and/or moisture, so that it can be doubted that this material is able to reduce hexavalent chromium in chromite ore residues over a number of years.

In the meantime, efforts have also been made to reduce Cr(VI) by a biological route. Reference may here be made to Zhu et al. (World J Microbiol Biotechnol, 2008, 24, 991-996) by way of example. They describe the use of *Leucobacter* sp. CR1B bacteria which were able to be isolated from a chromite ore residue landfill in Changsha (People's Republic of China). The bacteria are able to reduce dissolved Cr(VI), with the reduction occurring most readily at a neutral pH. Production and use of bacteria for reduction of Cr(VI) on a large scale conceals the disadvantage that no findings whatsoever on the long-term effects of these bacteria in the ecosystem are available at present.

Long-term studies on this subject are still required in order to be able to estimate whether this route represents a practicable alternative to the chemical reduction of Cr(VI) in chromite ore residues.

Thermal reduction processes for chromite ore residues have also been known for a long time. Thus, for example, some Japanese patents describe the use of reduced chromite ore residues as black and brown pigments in the production of ceramics (JP62 036061A and JP58-225158A) and roofing tiles (JP59-92968A, JP62 036061A), with a large amount of coke also sometimes being additionally added as reducing agent to the ceramic composition. According to data from the inventors, the following reactions in which Cr(VI) is converted into Cr(III) proceed during firing.

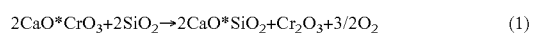

$$2CaO*CrO_3+2SiO_2 \rightarrow 2CaO*SiO_2+Cr_2O_3+3/2O_2 \qquad (1)$$

$$2Na_2O*CrO_3+2SiO_2 \rightarrow 2Na_2O*SiO_2+Cr_2O_3+3/2O_2 \qquad (2)$$

In the chocolate-coloured ceramics obtained after firing at at least 1200° C., Cr(VI) is obviously no longer detectable, but the analytical method employed and the atmosphere under which the ceramic bodies are fired are not disclosed. However, it has to be assumed that firing was carried out under reducing conditions because reoxidation of Cr(III) to sodium chromate always occurs at such a high temperature in the presence of oxygen or air and alkali metal ions.

Wang et al. (Journal of Hazardous Materials, 2007, 149, 440-444) describe the reduction of the Cr(VI) present in the chromite ore residue by means of sucrose, soluble starch or flour by reaction under inert gas at elevated temperatures. Here they report obtaining complete reduction of Cr(VI) to Cr(III) at temperatures up to 600° C. The chromite ore residue, which contains about 34% of CaO, is pulverized in a mortar and then mixed with the appropriate reducing agents in the laboratory experiments described. In order to ensure complete and uniform contact between the chromite ore residue particles and the reducing agent, these are added in an aqueous solution or suspension. The reduction is carried out in a tube furnace under a carbon dioxide atmosphere. Systematic variation of the reaction time, reaction temperature and the amount of reducing agent added was carried out. It is found here that, at a reaction temperature of 600° C., a mass ratio of 2.0:1 (reducing agent:Cr(VI)) is necessary in order to obtain complete reduction at a reaction time of 20 minutes. On the basis of the two reaction equations below, for the example of sucrose, it is found that 16 mol of Cr(VI) can be reduced by 1 mol of sucrose, i.e. at least 0.41 g of sucrose are theoretically required for reducing 1 g of Cr(VI):

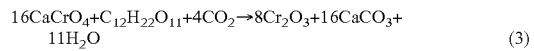

$$16CaCrO_4+C_{12}H_{22}O_{11}+4CO_2 \rightarrow 8Cr_2O_3+16CaCO_3+11H_2O \qquad (3)$$

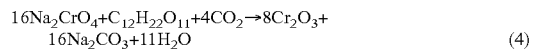

$$16Na_2CrO_4+C_{12}H_{22}O_{11}+4CO_2 \rightarrow 8Cr_2O_3+16Na_2CO_3+11H_2O \qquad (4)$$

However, in order to obtain complete reduction, at least a mass ratio of 2.0:1, i.e. 2.0 g of sucrose for 1 g of Cr(VI) has to be selected instead of the theoretical mass ratio of 0.41:1. Wang et al, indicate the proportion of water-soluble Cr(VI) in the chromite ore residue used by them to be 1.07%. At a mass ratio of 2.0:1 (reducing agent:Cr(VI)), this means that at least 2.14% by weight of reducing agent have to be added in order to obtain complete reduction, according to the analytical result.

The process for reducing Cr(VI) described by Wang et al. has a number of disadvantages. The reaction products obtained were leached out in accordance with the Chinese standard GB5086.2-1997 and analysed for Cr(VI) in accordance with GB/T115555.4-1995. GB/T5086.2-1997 merely describes an extraction with water at room temperature. Thus, only the water-soluble Cr(VI) is measured, while the sparingly soluble or insoluble Cr(VI)-containing compounds are not measured using this extraction process. This means that the results presented by Wang do not allow a statement to be made regarding the actual success of its reduction of Cr(VI) to Cr(III). James et al. (Environ. Sci. Technol. 1995, 29, 2377-2381) have examined and compared the extraction of Cr(VI) using various methods. It is clear from this that the digestion of Cr(VI) with a sodium carbonate/sodium hydroxide mixture (0.28 M $Na_2CO_3$ and 0.5 M NaOH) at 90-95° C. over a period of 60 minutes is the most effective method of measuring all types of Cr(VI), regardless of whether they are water-soluble or sparingly soluble. The latter digestion method, as described in USEPA (United States Environmental Protection Agency, USEPA) SW-846 method 3060A, is according to present-day knowledge the most sensitive extraction process for Cr(VI) in waste and is therefore also becoming increasingly established as standard analytical method for the release of Cr(VI) from chromite ore residues.

As our own studies show, the reaction products described by Wang et al. are not free of Cr(VI) even at a reaction temperature of 600° C. and a mass ratio of 2.0:1 (reducing agent:Cr(VI)) and a reaction time of 20 minutes when they are digested and analysed in accordance with USEPA SW-846 method 3060A. Complete reduction is thus only falsified, because an unsatisfactory analytical method is employed. It should also be mentioned that an extremely unpleasant odour occurs in the pyrrolysis of flour, starch or sucrose, and this is an additional disadvantage of this method of reduction.

Zhang et al. (Chemosphere, 2009, 77(8), 1143-45) describe the reduction of Cr(VI) in chromite ore residue by pyrrolysis using rice straw. In this publication, the reaction products were extracted in accordance with USEPA SW-846 method 3060A. The chromite ore residue used for the experiments contained 3400 ppm of Cr(VI). The rice straw:chromite ore residue ratio was varied in the range from 1:10 to 1:2 and the reaction temperature was increased up to 600° C. Under none of the reaction conditions described could a Cr(VI)-free end product be obtained. It always contained at least about 30 ppm of Cr(VI). Presumably, although the water-soluble Cr(VI) constituents were reduced by the pyrrolysis using rice straw, the sparingly soluble or insoluble Cr(VI) constituents remain, at least in part, as hexavalent chromium. In addition, sulphur compounds are brought into the process by the straw. Under the reducing conditions during the reaction, sulphides are formed and remain in the end product. When the reduced chromite ore residue is suspended in a weak acid, a very unpleasant odour of hydrogen sulphide ($H_2S$) arises.

Zhang et al. (Bioresource Technology, 2009, 100(11), 2874-2877) also describe the reduction of the Cr(VI) present in the chromite are residue by pyrrolysis using sewage sludges. Here, the sewage sludge is mixed in a ratio of 1:10 with chromite ore residue and subsequently subjected to a pyrrolysis at 600° C. The liberation of the Cr(VI) is likewise carried out by the alkaline digestion process described in USEPA SW-846 method 3060A. In this process, too, the Cr(VI) content of originally 3384 ppm in the untreated chromite ore residue can be decreased to only 24 ppm. The pyrrolysis of chromite ore residue using sewage sludges, as described by Zhang, is accordingly not a suitable process for obtaining Cr(VI)-free chromite ore residue. Furthermore, sulphur compounds are also introduced into the process here via the sewage sludges, and these can, as described above, cause an unpleasant odour of hydrogen sulphide ($H_2S$) to arise.

US 2004/0086438 A1 discloses a process by means of which the chromium present in the chromite ore residue and the iron can be recovered at the same time. Here, the chromite ore residue is firstly treated with at least 20% by weight of a metal hydroxide, preferably sodium or potassium or lithium hydroxide, at at least 350° C. for at least 10 minutes in air. This is followed by an acidic work-up which leads to an iron-rich insoluble residue. Further disadvantages are the molten metal hydroxides required, which are very corrosive and extremely difficult to handle. Implementation of this process on an industrial scale is therefore associated with considerable problems. Accordingly, only 1 g of chromite ore residue are reacted in small laboratory experiments in virtually all examples disclosed. In one example, a 100 g batch in a rotary tube furnace is described, but it is not indicated how this is operated. A further serious disadvantage of the process is that large amounts of hydroxides and acids are added, so that large amounts of dissolved salts are obtained. The salt content in the process water is therefore very high. In addition, a large amount of calcium oxide is advised for the process, since the calcium is required for precipitation of sulphate as calcium sulphate. The disadvantages of the addition of calcium oxide have already been mentioned.

It was an object of the present invention to provide an economically useable process by means of which the hexavalent chromium present in an oxidic solid is reduced to such an extent that Cr(VI) can no longer be detected (proportion of Cr(VI) according to analysis method I<640 ppb) in the resulting end product according to a modified alkaline digestion process I which is disclosed here and is based on USEPA SW-846 method 3060A. If the Cr(VI) content is determined according to as further modified form, which is disclosed here, of this alkaline digestion process (modified alkaline digestion process II), the Cr(VI) content can be determined even down to <107 ppb.

The useful aspect of the process of the invention is that the reduced oxidic solid obtained, in particular the chromite ore residue, no longer has to be regarded as hazardous material and disposed of in a landfill, but can be introduced as material of value into a new value added chain.

It has surprisingly been able to be found that the complete, according to the analytical method, reduction of hexavalent chromium in oxidic solids containing Cr(VI), preferably chromite ore residues, con be successfully carried out in a very advantageous way in as thermal reduction process in which carbon-containing compounds which are liquid in the range from 20 to 100° C. are used.

The invention therefore provides a process for reducing hexavalent chromium in oxidic solids, which comprises the steps:
a) mixing of the oxidic solid containing Cr(VI) with a carbon-containing compound which is liquid in the range from 20 to 100° C.,
b) treatment of the mixture obtained after a) in an indirectly heated reactor at a temperature of from 700° C. to 1100° C., particularly preferably at a temperature of from 800° C. to 1000° C. under a protective atmosphere,
c) cooling of the reaction product obtained after b) to at least 300° C., preferably at least 150° C., under a protective atmosphere.

Step a)

It is in principle possible to use all types of oxidic solids containing hexavalent chromium for the process of the invention. Preference is given to using chrome ore residues which are obtained in the oxidative alkaline digestion of chrome ores, for example chromite, for the production of sodium monochromate. Preference is also given to using other Cr(VI)-containing residues as are obtained, for example, from the work-up and reprocessing of sodium monochromate, with Cr(VI)-containing material, particularly preferably calcium vanadate, which is formed in the separation of vanadium from the monochromate solution, being used as such residue. It is also possible to use mixtures of oxidic solids. Such a mixture preferably contains chrome ore residues and other residues containing Cr(VI) as are obtained, for example, from the work-up and reprocessing of sodium monochromate, with Cr(VI)-containing material, particularly preferably calcium vanadate, which is formed in the separation of vanadium from the monochromate solution, being used as such residue. The oxidic solids can contain further metal oxides such as chromium(III) oxide, aluminium oxide, iron(II) oxide, iron(II,III) oxide, iron(III) oxide, spinel mixed phases, magnesium oxide, calcium oxide, silicon dioxide and sodium oxide.

The oxidic solids preferably have a Cr(VI) content of up to 80 000 ppm, particularly preferably up to 50 000 ppm, determined by the modified alkaline digestion method I based on USEPA SW-846 method 3060A. They can be introduced into step a) as water-containing filter cake. However, in a preferred embodiment of the process of the invention, they are used in dried form. They particularly preferably have a moisture content of not more than 2.0% by weight, very particularly preferably less than 1.0% by weight. The CaO content of the oxidic solid is not important for the purposes of the invention and is preferably less than 5% by weight, very particularly preferably less than 10% by weight, in particular less than 5% by weight. Preference is given to using oxidic solids having a chromium(III) oxide content of from 8 to 10% by weight, of aluminium oxide of from 22 to 24% by weight, of iron(III) oxide of from 44 to 47% by weight, of silicon dioxide of from 1 to 3% by weight, and of sodium oxide of from 3 to 5% by weight. The oxidic solids preferably have a very low sulphur content, in particular less than 300 ppm, particularly preferably less than 200 ppm, very particularly preferably less than 100 ppm. Chrome ore residues which contain particularly preferred oxidic solids preferably contain up to 10 000 ppm of Cr(VI) and have a vanadium content of less than 0.5% by weight. The chrome ore residues are usually obtained as moist fiber cakes in the process for producing sodium monochromate after solid-liquid separation, and can be fed in this form to step a). Other residues containing Cr(VI) are preferably used with a vanadium content of from 12 to 15% by weight. Mixtures of chrome ore residue and vanadate-containing other residue preferably contain up to 20 000 ppm of Cr(VI). Mixtures of oxidic solids preferably contain at least 85% by weight of chrome ore residues, particularly preferably at least 90% by weight of chrome ore residues.

Oxidic solids in which at least 90% of the particles are smaller than 500 µm, very particularly preferably smaller than 300 µm, are preferably used for the process of the invention. Such particle sizes can, if necessary, be achieved by sieving and/or milling before step a).

For the purposes of the present process, the substance referred to hereinafter as carbon-containing compound which is liquid in the range from 20 to 100° C. is a substance which is present as liquid within the entire temperature range from 20 to 100° C. or has a melting point in the range from 20 to 100° C. and decomposes on heating, preferably at temperatures of >150° C., instead of vaporizing. The thermal decomposition can be considered to be a pyrolysis since the carbon-containing compound decomposes due to rupture of chemical bonds.

In step a), it is possible to use only one carbon-containing compound which is liquid in the range from 20 to 100° C. or else a mixture of a plurality of carbon-containing compounds which are liquid in the range from 20 to 100° C. As carbon-containing compounds which are liquid in the range from 20 to 100° C., preference is given to using polyhydroxy compounds, very particularly preferably glycerol or a liquid polyethylene glycol, in particular a polyethylene glycol having a molar mass of up to 600. These compounds can be obtained in very high purity, as a result of which no sulphur is introduced into the reduction process so that, even when the reduced chrome ore residue is suspended in an acid, no odour of hydrogen sulphide arises.

The amount of the carbon-containing compound which is liquid in the range from 20 to 100° C. mixed with the oxidic solid, in particular with the chrome ore residue, depends on the Cr(VI) content of the oxidic solid and on the type of carbon-containing compound which is liquid in the range from 20 to 100° C. used. However, it should be ensured that a sufficient excess of the carbon-containing compound to ensure complete reduction of the Cr(VI) is present. For example, if the following reaction equation

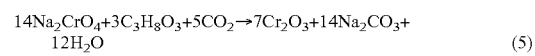

$$14Na_2CrO_4 + 3C_3H_8O_3 + 5CO_2 \rightarrow 7Cr_2O_3 + 14Na_2CO_3 + 12H_2O \qquad (5)$$

is assumed for reduction of Cr(VI) by means of glycerol, it can be seen that 14 mol of Cr(VI) can be reduced by 3 mol of glycerol, i.e. at least 0.38 g of glycerol are theoretically required for reducing 1 g of Cr(VI). In order to ensure complete reduction of Cr(VI) in the water-insoluble and sparingly water-soluble compounds, too, a mass ratio of at least 4:1 should be selected, i.e. 4.0 g of glycerol are used for the reduction of 1 g of Cr(VI), instead of the theoretical mass ratio of 0.38:1. Very particular preference is given to selecting a mass ratio in the range from 4:1 to 15:1 (mass of glycerol mass of Cr(VI) in the oxidic solid). This mass ratio is also employed when using polyethylene glycol having a molar mass of from 380 to 420. When other carbon-containing compounds which are liquid in the range from 20 to 100° C. are used, the mass ratio of carbon-containing compound which is liquid in the range from 20 to 100° C. to be used to mass of Cr(VI) has to be determined in an analogous way.

The carbon-containing compound which is liquid in the range from 20 to 100° C. is generally used in an amount of from 0.5% by weight to 5.0% by weight, particularly preferably from 0.75% by weight to 2.5% by weight, based on the mass of dried oxidic solid containing Cr(VI).

Preference is likewise given to selecting the amount of the carbon-containing compound which is liquid in the range from 20 to 100° C. and the amount of the Cr(VI)-containing compound to be reduced in such a way that the molar ratio of the carbon atoms of the former compound to the chromium(VI) atoms to be reduced in the latter compound is from 5:1 to 35:1. In the case of glycerol or polyethylene glycol having a molar mass of from 380 to 420 as reducing agent, particular preference is given to selecting a molar ratio of carbon to Cr(VI) of from 9:1 to 23:1.

Mixing of the oxidic solid with a carbon containing compound which is liquid in the range from 20 to 100° C.

can be carded out at room temperature or at elevated temperature, preferably up to 100° C.

In step a), the oxidic solid is mixed with a carbon-containing compound which is liquid in the range from 20 to 100° C. in such a way that the oxidic solid particles are wetted with the latter. A person skilled in the art knows many continuously and discontinuously operating mixers by means of which a solid and a liquid can be mixed in order to obtain wetted particles. Mixing of the oxidic solid with a carbon-containing compound which is liquid in the range from 20 to 100° C. in order to obtain wetted oxidic solid particles is preferably carried out in a continuously operating mixing apparatus. Chrome ore residues can tend to form dust because of their fines content. The wetted oxidic solid particles obtained after mixing with the carbon-containing compound which is liquid in the range from 20 to 100° C. have virtually no tendency to form dust, which is advantageous and desirable for reasons of occupational safety and occupational hygiene.

Apart from the carbon containing compound which is liquid in the range from 20 to 100° C., further auxiliaries which promote the processability of the mixture produced can be added to the oxidic solid in step a).

As an example of an auxiliary which promotes the processability of the mixture produced, mention may be made of pyrogenic silica which is commercially available under the trade name Aerosil® (commercial products of Evonik Industries AG) and acts as flow improver. However, other silicates or aluminates or aluminosilicates can also be added.

Step b)

The mixture obtained in step a) is fed to a thermal reduction in which the hexavalent chromium is reduced.

Heating of the hexavalent chromium is carried out under a protective atmosphere, preferably consisting, of noble gases, in particular helium or argon, nitrogen and/or carbon dioxide, with the latter being particularly preferred.

The thermal reduction takes place at a temperature of from 700° C. to 1100° C., preferably at a temperature of from 800° C. to 1000° C.

The thermal reduction in step b) can be carried out in a continuously operating or discontinuously operating indirectly heated reactor, with continuously operating indirectly heated reactors being particularly preferred. An example of such reactors are rotary tube furnaces which are indirectly heated by means of gas or electrically.

The use of indirectly heated reactors has the additional advantage that only a very low gas flow prevails in the reaction space itself, as a result of which virtually no dust is discharged. This is additionally favoured by the relatively small added amount of the carbon-containing compound which is liquid in the range from 20 to 100° C. Only very small amounts of offgas are formed in the thermal reduction as a result.

During heating up, the carbon-containing compound which is liquid in the range from 20 to 100° C. is subjected to a pyrrolysis by means of which the chemical bonds are broken and reactive radicals or reactive intermediates, which reduce the hexavalent chromium, are formed. For this reason, it is advantageous for homogeneous and uniform wetting of the oxidic solid particles to be achieved in step a) because the reactive radicals or reactive intermediates are then formed on the entire surface of the oxidic solid particle.

Step c)

The reaction product obtained after the thermal reduction and fed to step c) has to be cooled from its original reaction temperature.

The cooling of the reaction product obtained in b) is carried out at least to a temperature of at least 300° C., particularly preferably at least 150° C., under a protective atmosphere, preferably consisting of noble gases, in particular helium or argon, nitrogen and/or carbon dioxide, with the latter being particularly preferred. The subsequent cooling, in particular to room temperature, can then be carried out in the presence of air. Reoxidation of Cr(III) to Cr(VI) can be effectively avoided in this way, as studies have shown.

The cooling of the resulting reaction product in step c) is carried out in a continuously operating or discontinuously operating cooling apparatus, preferably in a continuously operating cooling apparatus. As examples of continuously operating cooling apparatuses, mention may here be made of fixed-bed heating exchangers, screw heat exchangers (cooling screws) or cooling drums.

It is in principle also possible to quench the reaction product obtained from step b) in water. This makes rapid and simple cooling possible. However, a disadvantage in this case is that the reaction product is obtained as an aqueous suspension which first has to be worked up further, for example by means of solid/liquid separation and subsequent drying. This makes little sense from an energy point of view because the reaction product obtained from step b) is already dry and can be directly processed further in this state. However, preference is given to carrying out the cooling as per step c) under a protective gas atmosphere.

The cooled reaction product obtained after step c) can optionally be subjected to additional sieving and/or milling.

The Cr(VI) content of the cooled reaction product obtained after step c) is determined by the modified alkaline digestion process I and/or II disclosed.

A reduced oxidic solid is obtained after step c). Preference is given to obtaining a reduced oxidic solid which is characterized in that it contains a proportion of less than 15% by weight of calcium oxide, particularly preferably less than 10% by weight of calcium oxide, very particularly preferably less than 5% by weight of calcium oxide.

The invention also encompasses the use of the reduced oxidic solid produced by the process of the invention as filler in the production of lime- and/or cement-bonded building materials or of asphalt. It can also be used for the production of steel or other alloys.

Furthermore, the invention encompasses lime- or cement-bonded building materials or asphalt containing the reduced oxidic solid.

A combination of the reduced oxidic solid obtained after step c) with a mixture containing cement and aggregates, in particular sand, for the production of bricks and paving stones displayed positive effects. In a typical mixture containing cement and sand, as is used for the production of bricks or paving stones, cement and sand are present in a ratio of from 1:4 to 1:12, preferably from 1:7 to 1:9. It was able to be shown that a combination of the reduced oxidic solid with a mixture containing cement and sand enabled the abrasion and also the water absorption of the bricks and paving stones produced from this mixture to be significantly reduced when part of the cement is replaced by the reduced oxidic solid obtained after step c). Due to a reduction in the abrasion and the water absorption, the bricks and paving stones are more resistant.

It a preferred embodiment, up to 50% of the cement, particularly preferably up to 30% of the cement, in a mixture of cement and sand in the ratio of from 1:4 to 1:12, preferably from 1:7 to 1:9, for cement-bonded building materials is replaced by the reduced oxidic solid obtained after step c).

EXAMPLES

1. Determination of the Cr(VI) Content
Description of the Test Methods Used:
Modified Alkaline Digestion Process I:

The determination of the Cr(VI) content of the oxidic solids used as starting materials and also the reaction products obtained was carried out by a method based on the alkaline digestion process described in USEPA SW-846 method 3060A.

When the oxidic solid contains more than 2 by weight of water, it is dried to constant weight at 120° C. and then weighed out. However, in contrast to the process described in USEPA SW-846 method 3060A, not from 2.4 g to 2.6 g of the sample to be examined are digested, but instead from 9.9 g to 10.1 g (balance accuracy 0.0001 g) of the oxidic solid are transferred quantitatively into a reaction flask having a protective gas connection. 50 ml of the alkaline digestion solution (produced by dissolving 20.0 g of NaOH (0.5 M) and 29.7 g of $Na_2CO_3$ (0.28 M) in 100 l of demineralized water), 2 ml of a $Mg(NO_3)_2$ solution (prepared by dissolving 60.0 g of $Mg(NO_3)_2 \cdot 6 H_2O$ in 1.00 l of demineralized water) and 0.5 ml of a buffer solution having pH=7 are then added. The suspension is blanketed with nitrogen protective gas, heated to boiling while stirring and heated under reflux for one hour, with continuous blanketing with nitrogen protective gas being carried out. After one hour, the suspension is cooled to room temperature while stirring, with the blanketing with nitrogen being maintained. The mixture is subsequently filtered in air and the filter cake is intensively washed with demineralized water. The mother liquor and washings obtained during filtration and washing are combined in a 500 ml standard flask, made up to the mark with demineralized water and analysed for Cr(VI) as described below. In contrast to the procedure described in USEPA SW-846 method 3060A, a significantly larger amount of sample is thus used, but the alkaline extract is finally made up to 500 ml instead of 250 ml in the standard flask. Nevertheless, twice the Cr(VI) concentration in the standard solution used for the Cr(VI) determination by UV/VIS spectroscopy results from the above-described method, compared to the procedure described in USEPA SW-846 method 3060A.

Modified Alkaline Digestion Process II:

The reduced oxidic solids obtained by the process of the invention contain only very small amounts of Cr(VI) which are so small that they cannot be quantified in the alkaline extract obtained by the above-described process. In order to attain a further increase in the sensitivity of the determination of Cr(VI) in the reduced oxidic solid, the reduced oxidic solid samples as obtained from the process of the invention were additionally subjected to a modified alkaline digestion process II. Here, from 29.9 g to 30.1 g (balance accuracy 0.0001 g) of the oxidic solid were used and extracted as described above.

The mother liquor and washings obtained after filtration and washing are combined in a 250 ml standard flask and made up to the mark with demineralised water. This modified alkaline digestion process II thus gives an alkaline extract which, compared to the process described in USEPA SW-846 method 3060A, has twelve times the Cr(VI) concentration. The analysis for chromium(VI) is carried out as described below.

UV/Vis Spectroscopy for Determining Chromium(VI) Content:

A small amount of the clear solution is taken off from the standard flask containing the alkaline extract obtained from the modified alkaline digestion process I or II and brought to a pH of 7 by means of dilute hydrochloric acid. This generally gives a precipitate of aluminium and silicon hydroxides, which is centrifuged off. The clear centrifugate obtained is filtered through a 0.45 µm syringe filter and its Cr(VI) content after setting of the pH, is determined as 1,5-diphenylcarbazide complex by means of UV/Vis spectroscopy as described in USEPA method 218.7. The measured Cr(VI) concentration is, if it can be quantified, back-calculated taking into account the dilution brought about by the adjustment of the pH with the dilate hydrochloric add to the basis of the mass of the oxidic solid originally used.

The determination of the Cr(VI) content was carried out at a wavelength of 539 nm on an automated UV/Vis spectrometer, model Metrohm 844 UV/VIS Compact IC. In this instrument, the monochromate is firstly separated off from other anions by means of an anion-exchange column before being reacted with 1,5-diphenylcarbazide in an after-column reactor and determined spectrophotometrically in the case of the instrument used, the Cr(VI) determination limit is 0.0128 mg/l of Cr(VI). Taking into account 10 g of dried oxidic solid used for the above-described alkaline digestion process I gives a determination limit of 0.64 mg of Cr(VI) per kg of oxidic solid, corresponding to 640 ppb of Cr(VI). Taking into account 30 g of dried oxidic solid used for the above-described modified alkaline digestion process I gives a determination limit of 0.107 mg of Cr(VI) per kg of oxidic solid, corresponding to 107 ppb of Cr(VI).

Examples 1-6

The invention is explained in more detail by the following examples without the invention being intended to be restricted thereby.

For the following examples, chrome ore residue from the industrial process for producing sodium monochromate from chromite via an oxidative alkaline digestion with sodium carbonate (known as no lime-process, CaO content <5% by weight) was used. The chrome ore residue obtained in the form of a moist filter cake in the process for producing sodium monochromate after solid-liquid separation was merely dried but not sieved or milled. The composition of the dried chrome ore residue can be seen from the following Table 1.

General Procedure

Dried chrome ore residue whose Cr(VI) content had been determined by the above-described modified alkaline digestion method 1 was mixed with a carbon containing compound which is liquid in the range from 20 to 100° C. (glycerol or PEG having a molar mass of from 330 to 420) in order to obtain wetted chrome ore residue particles. This mixture was introduced into an electrically indirectly heated rotary tube furnace. The furnace tube had a total length of 1.5 m, of which 1.1 m were heated. The tube diameter was 0.3 m and the furnace was operated at a particular speed of rotation. A particular reaction temperature and a protective atmosphere of carbon dioxide prevailed in the furnace. The product obtained was cooled to at least 150° C. under a carbon dioxide atmosphere.

After cooling, the black reduced chrome are residue reaction product was taken out, sieved through a 300 µm sieve and about 10 g of the fines were worked up by the above-described alkaline digestion process I and the Cr(VI) content of the alkaline extract was determined by means of UV/Vis spectroscopy. It was below the determination limit of 640 ppb. The Cr(VI) content was then still below the determination limit even when the reduced chrome ore residue reaction product was worked up by the above-described modified alkaline digestion process II. The Cr(VI) content of the reduced chrome ore residue reaction product was thus below 107 ppb of Cr(VI). The reduced chrome ore residue obtained thus no longer contained Cr(VI) which could be detected in this way.

Example 6 was carried out according to the above-described general procedure, with the modification that a dried Cr(VI)-containing calcium vanadate filter cake formed in the separation of vanadate from a sodium monochromate solution was added to the dried chrome ore residue (3.5% by weight based on the dried chrome ore residue, vanadium content 13.80% by weight, Cr(VI) content 6.46% by weight) and the mixture was mixed as described above with a carbon-containing compound which is liquid in the range from 20 to 100° C.

Table 1 shows the reaction parameters of six reaction examples carried out in the manner described above. In addition, the composition of the dried chrome ore residue used in the individual examples is indicated (calculated as metal oxides, scaled to 100%). Polyethylene glycol having a molar mass of from 380 to 420 is designated as PEG-400 in Table 1.

(Example 2) than in the case of the paving stones produced without the reduced oxidic solid (Example 1). The paving stones in which 30% of the cement had been replaced by the reduced oxidic solid (Example 3) have even better values. The paving stones of Example 3 fulfil the requirements of SANS 1058:2012 in respect of abrasion and water absorption.

| Example | Abrasion per paving stone in g | Water absorption per paving stone in % |
|---|---|---|
| 1 (Reference specimens) | 27.5 | 7.1 |
|  | 35.2 | 7.4 |
|  | 25.2 | 7.5 |
| 2 | 16.0 | 6.8 |
|  | 19.6 | 7.4 |
|  | 17.7 | 7.1 |
| 3 | 7.0 | 5.0 |
|  | 5.7 | 5.9 |
|  | 8.6 | 5.7 |

TABLE 1

|  | Example |  |  |  |  |  |
|---|---|---|---|---|---|---|
|  | 1 | 2 | 3 | 4 | 5 | 6 |
| Carbon-containing compound which is liquid in the range from 20 to 100° C. and its proportion based on the mass of dried chrome ore residue [% by weight] | PEG-400, 1.0 | Glycerol, 1.5 | PEG-400, 1.5 | Glycerol, 1.0 | PEG-400, 0.75 | PEG-400, 1.5 |
| Mass ratio of carbon-containing compound which is liquid in the range from 20 to 100° C.:Cr(VI) | 8.9:1.0 | 13.3:1.0 | 9.4:1.0 | 10.3:1.0 | 8.8:1.0 | 4.2:1.0 |
| Molar ratio of carbon (of the carbon-containing compound which is liquid in the range from 20 to 100° C.):Cr(VI) | 20.73 | 22.51 | 22.02 | 17.37 | 20.65 | 9.85 |
| Input rate into the reactor [kg/h] | 17.6 | 13.8 | 11.2 | 25.7 | 10.3 | 20.0 |
| Rotational speed [rpm] | 3 | 3 | 2 | 3 | 2 | 3 |
| Furnace temperature [° C.] | 900 | 900 | 800 | 900 | 900 | 900 |
| Cr(VI) content [ppm] | 1129 | 1129 | 1594 | 975 | 850 | 3563 |
| $Cr_2O_3$ content [% by weight] | 9.55 | 9.55 | 8.17 | 9.29 | 9.54 | 9.72 |
| $Al_2O_3$ content [% by weight] | 22.83 | 22.83 | 22.88 | 23.04 | 23.00 | 23.07 |
| $Fe_2O_3$ content [% by weight] | 44.23 | 44.23 | 45.37 | 44.32 | 45.73 | 46.32 |
| MgO [% by weight] | 14.85 | 14.85 | 14.63 | 14.53 | 15.21 | 14.82 |
| CaO content [% by weight] | 0.65 | 0.65 | 0.76 | 0.71 | 0.08 | 0.07 |
| $SiO_2$ content [% by weight] | 2.58 | 2.58 | 2.45 | 2.43 | 1.65 | 1.49 |
| $Na_2O$ content [% by weight] | 4.20 | 4.20 | 4.66 | 4.60 | 3.72 | 3.43 |
| Others [% by weight] | 1.11 | 1.11 | 1.08 | 1.08 | 1.07 | 1.08 |

2. Determination or Abrasion and Water Absorption

Paving stones were produced from a mixture of cement and sand (ratio 1:8) and water without addition of the reduced oxidic solid (Example 1, reference specimens). Under identical conditions, paving stones in which 20% (Example 2) or 30% (Example 3) of the cement had been replaced by the reduced oxidic solid obtained after step c) of the process of the invention were produced. After curing for 28 days, the abrasion and water absorption were determined on the paving stones obtained—in accordance with the method described in SANS 1058:2012 (South African National Standard 1058:2012, Edition 2.1 "Concrete paving blocks"). However, as a modification of SANS 1058:2012, the two properties were determined only on three specimens.

It can be seen that both abrasion and water absorption is significantly lower in the case of the paving stones in which 20% of the cement had been replaced by the reduced oxidic solid obtained after step c) of the process of the invention

What is claimed is:

1. A process for reducing hexavalent chromium in oxidic solids, the process comprising:
   a) mixing an oxidic solid containing Cr(VI) with a carbon-containing compound to form a mixture, wherein the carbon-containing compound is a compound that is liquid at temperatures from 20° C. to 100° C.,
   b) treating the mixture obtained after a) in an indirectly heated reactor at a temperature of 700° C. to 1100° C. under a protective atmosphere to form a reaction product, and
   c) cooling of the reaction product obtained after b) to a temperature of 300° C. or less under a protective atmosphere to form a reduced process product.

2. The process according to claim 1, wherein the oxidic solid contains a proportion of less than 15% by weight of calcium oxide.

3. The process according to claim 1, wherein the oxidic solid is a chrome ore residue.

4. The process according to claim 1, wherein the carbon-containing compound comprises a polyhydroxy compound.

5. The process according to claim 1, wherein, instead of vaporizing, the carbon-containing compound decomposes at temperatures of ≥150° C.

6. The process according to claim 1, wherein the carbon-containing compound comprises glycerol, polyethylene glycol having a molar mass of from 380 to 420, or a mixture of the two in a mass ratio of from 4:1 to 15:1, based on the mass of Cr(VI).

7. The process according to claim 1, wherein carbon of the carbon-containing compound is used in a molar ratio to Cr(VI) of from 5:1 to 35:1.

8. The process according to claim 1, wherein:
the carbon-containing compound comprises glycerol, polyethylene glycol having a molar mass of from 380 to 420, or a mixture of the two; and
carbon of the carbon-containing compound is used in a molar ratio to Cr(VI) of from 9:1 to 23:1.

9. The process according to claim 1, further comprising conducting step a) in a continuously operating mixing apparatus.

10. The process according to claim 1, further comprising conducting step b) in a continuously operating indirectly heated reactor.

11. The process according to claim 1, further comprising conducting step c) in a continuously operating cooling apparatus.

12. The process according to claim 1, wherein the oxidic solid has a water content.

13. The process according to claim 1, further comprising in step a), adding auxiliaries which improve the processability of the mixture produced, wherein the auxiliaries are selected from the group consisting of silicas, silicates, aluminates, and aluminosilicates.

14. The process according to claim 1, wherein the oxidic solid contains up to 80,000 ppm of Cr(VI).

15. The process according to claim 3, wherein the chrome ore residue contains up to 10,000 ppm of Cr(VI).

16. The process according to claim 3, wherein the chrome ore residue comprises a mixture of chrome ore residue and other residue, with the mixture containing up to 20 000 ppm of Cr(VI).

17. The process according to claim 1, wherein the process product has a Cr(VI) content of <640 ppb.

* * * * *